Figure 1:
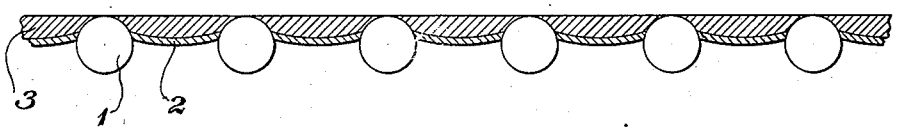

June 13, 1944.  A. W. BATEMAN  2,351,182

PROCESS FOR TREATING FABRICS AND PRODUCTS PRODUCED THEREBY

Filed Aug. 3, 1940

Alva W. Bateman

INVENTOR

BY Frank C. Hilberg
ATTORNEY

Patented June 13, 1944

2,351,182

UNITED STATES PATENT OFFICE 2,351,182

PROCESS FOR TREATING FABRIC AND PRODUCT PRODUCED THEREBY

Alva W. Bateman, Newburgh, N. Y., assignor to E. I. du Pont de Nemours & Company, Wilmington, Del., a corporation of Delaware Application August 3, 1940, Serial No. 350,257

11 Claims. (Cl. 117—73)

This invention relates to joining pieces of carpet and more particularly to a treated open weave fabric tape used in joining sections of carpet. It also relates to a coating composition designed to bridge large interstices in an open weave fabric used in joining the carpet sections.

In the manufacture of carpets of the type comprising a plurality of sections it is a common practice to sew the edges of the sections together. This method, however, produces an unsightly seam and results in excessive wear of the pile at the seam. Several methods have been proposed for uniting adjacent edges of sections of carpeting to eliminate the need for sewing with its attendant undesirable results. In one method the edges are joined with metal staples. Another method employs an open weave fabric strip adhesively fixed across the adjacent edges of the carpet sections. The adhesive is usually one which is thermoplastic and becomes cementitious by treatment with solvent or under the influences of heat and pressure or both. Normally the thermoplastic adhesive is calendered on one side of the open weave fabric and there is a tendency for the adhesive to strike through to the opposite side of the fabric. In the joining of the carpet sections a strip of the thermoplastic adhesive coated open weave fabric about three inches wide is placed over the abutted edges on the back of the carpet sections with the thermoplastic coating next to the carpet. The thermoplastic coating is rendered cementitious by the application of heat and pressure by means of a hot flatiron. When the thermoplastic coating strikes through the open weave fabric it will stick to the hot flatiron which results in considerable manufacturing difficulties.

This invention, therefore, has as an object the provision of a method to prevent the thermoplastic adhesive coating compositions from striking through open weave fabrics used in the joining of carpet sections.

Another object of the invention is the provision of a composition which will bridge large interstices in open weave fabrics.

A further object is the provision of a bridging composition which has good heat transfer and does not become sticky when subjected to a temperature of about 400° F. for a period of two or three minutes.

A still further object is the provision of a coated open weave fabric used in joining carpet seams which overcomes the disadvantages of the prior art material and is characterized by great resistance to tearing apart from the abutted edges of carpet sections.

Other objects will appear hereinafter as the description of the invention proceeds.

The objects of this invention are accomplished by a doctor application of a non-thermoadhesive film forming composition containing at least 5% on a dry basis of a polyvinyl acetate in such a manner and in sufficient quantity that the large interstices of an open weave fabric are bridged or closed by the said film forming composition. Separate individual films are produced in each interstice such that they do not extend over the tops of the individual threads and preferably not below the middle horizontal plane of the interstice. The opposite side from which the bridging composition is applied is coated with a thermoadhesive composition which becomes cementitious under the influences of heat and pressure.

Figure 2:
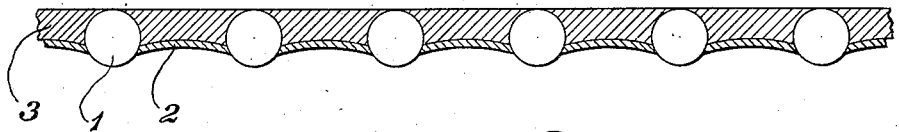

In the drawing Figs. 1 and 2 are enlarged diagrammatic sections of a treated fabric. In both figures, 1 is a thread end; 2 represents the non-thermoadhesive film of polyvinyl acetate; and 3 is a coating of a thermoadhesive composition. In Fig. 1 the composition 3 is applied on the same side as composition 2, whereas in Fig. 2 it is applied on the opposite side.

The preferred embodiment of this invention employs an open weave fabric with a leno weave. In a leno woven fabric in order to prevent the threads in the warp and filling from slipping out of relation to one another at least one set of threads is securely anchored at the point of attachment to the other. The filling is shot straight across the fabric, as in any plain weave, but the warp threads are alternatively twisted in a right and left-handed direction so as to cross between each pick. This prevents the filling thread from sliding along the warp, and by the tightness of the twist restrains the warp threads also from displacement, which maintains the original size of the interstices during the bridging and subsequent coating operation.

The leno woven fabric having the large interstices is particularly adapted for use in joining separate sections of carpets due to the exceptionally high tearing strength, and large interstices which provide rapid heat transfer from a hot flatiron on one side of the fabric to the thermoplastic adhesive on the opposite side of the fabric. The large interstices are first bridged with a non-thermoadhesive film forming composition 2 containing a polyvinyl acetate having certain characteristics which is resistant to the development of stickiness at the temperature of a hot flatiron and subsequently coated with a thermoadhesive composition 3 to provide a surface which may be readily and easily combined to the back of the carpet. This is due to the relatively large areas of adhesive coating and relatively small areas of threads to contact the carpet backing.

The following specific examples are given by way of illustration and not limitation.

Example I

The individual interstices of a leno woven fabric dyed a suitable color and having the following construction:

Size of interstices:
  Warp _____ mm __ 1.13
  Filler _____ mm __ 1.45
Area of interstices _____ sq. mm __ 1.63
Size of threads (diameter):
  Warp _____ mm __ 1.12
  Filler _____ mm __ 1.70
Number of threads per foot:
  Warp _____ 126
  Filler _____ 106 was bridged by applying one or more coats of the following bridging composition:

|  | Percent by weight |
|---|---|
| Cellulose acetate | 16.3 |
| Polyvinyl acetate | 1.6 |
| Ethyl acetate | 44.8 |
| Ethyl alcohol | 13.9 |
| Acetone | 23.4 |

The above composition was compounded by first preparing the following cellulose acetate dispersion:

|  | Percent by weight |
|---|---|
| Cellulose acetate | 19.4 |
| Ethyl acetate | 44.7 |
| Acetone | 28.0 |
| Ethyl alcohol | 7.9 | and the following polyvinyl acetate solution:

|  | Percent by weight |
|---|---|
| Polyvinyl acetate | 10.0 |
| Ethyl acetate | 45.0 |
| Ethyl alcohol | 45.0 |

The bridging composition was then prepared by mixing 100 parts of the cellulose acetate solution with 19.4 parts of the polyvinyl acetate solution.

The cellulose acetate had a combined acetic acid content of 54.5% to 55.5% and a viscosity characteristic of 2–6 seconds as determined by the falling ball method using a 20% solution of the cellulose acetate in acetone.

A 10% solution of the polyvinyl acetate described above was stringy and had a viscosity characteristic of 7 seconds at 20° C. as determined by the falling ball method described in A. S. T. M. method 301–33, and using a solvent mixture consisting of equal parts of ethyl acetate and ethyl alcohol.

In order to adjust the thickness and reduce the bulk of the fabric the dyed leno woven fabric, 42½" wide, was given a pressure treatment by pressing between two smooth surfaces in a conventional embossing press or rollers. Sufficient pressure was applied to reduce the thickness of the fabric to approximately .024".

Following the pressure treatment the bridging composition was applied by means of the apparatus described in the patent issued to W. T. Anderson, February 8, 1938, No. 2,107,276, and the composition was dried by passing the material through a suitable drying chamber, such as described in the patent issued to W. T. Anderson et al. February 8, 1938, No. 2,107,275.

Substantially all the interstices of the fabric were bridged or closed by one application of the bridging composition, but to insure 100% bridging of the interstices the fabric was given two applications of the bridging composition. An individual film was deposited in each interstice and the sharp edge of the doctor knife removed the composition from the tops of the threads and forced the composition down in the interstices. Upon the removal of the volatile solvents an individual film was formed between the plane of the tops of the threads and the middle horizontal plane of the interstice. The weight of the individual dry films per yard of fabric 42" wide corresponded to approximately 1.0 ounce.

Following the bridging of the interstices the fabric was then coated on the side opposite from which the bridging composition was applied with a thermoadhesive composition.

The thermoadhesive composition per se forms no part of this invention except as set forth in the appended claims since it may be of any conventional type which will anchor to the bridged leno cloth and become cementitious under the influences of heat and pressure. Thermoadhesive cements employing vinyl resins, such as vinyl chloride, vinyl acetate, co-polymer of vinyl acetate and vinyl chloride, and polymeric methacrylic acid esters blended with suitable plasticizers may be used. Thermoadhesive cements employing cellulose derivatives such as ethyl cellulose and cellulose acetate may be used with varying degrees of success.

The plasticized thermoadhesive composition was applied by means of calender rolls such as are used in the rubber coated fabric industry. Following the application of the plasticized thermoadhesive composition the treated fabric was cut into three inch strips and was supplied to the carpet manufacturers in this form.

In practice the edges of two carpet sections are abutted and the 3" treated fabric strip is placed over the abutted edges of the carpet section, the thermoadhesive coating being in contact with the carpet backing.

Heat and pressure are applied to the 3" fabric strip overlying the abutted edges of the carpet seam by means of a flatiron heated to approximately 400° F. for a period of two to three minutes. The non-thermoadhesive individual bridged films which are between the heated surface of the flatiron and the thermoadhesive cement transferred the heat from the flatiron to the thermoadhesive composition without becoming cementitious and sticking to the heated flatiron. The thermoadhesive cement becomes cementitious and adheres to the back of the separate carpet sections, thereby combining the two separate carpet sections.

Example II

A leno woven fabric having the following construction:

Size of interstices:
  Warp _____ mm __ 1.671
  Filler _____ mm __ 2.068
Area of interstices _____ sq. mm __ 3.456
Size of threads (diameter):
  Warp _____ mm __ .9519
  Filler _____ mm __ 1.388
Number of threads per foot:
  Warp _____ 106
  Filler _____ 108 was treated in the manner described in Example I, except 2.5 ounces (on a dry basis) per yard per 42" width of the following bridging composition was applied in a plurality of applications:

|  | Percent |
|---|---|
| Polyvinyl acetate | 10.0 |
| Ethyl acetate | 45.0 |
| Ethyl alcohol | 45.0 |

The polyvinyl acetate in the above composition was the same as that described in Example I.

Example III

A leno woven fabric having the following construction:

Size of interstices:
| Warp | mm | 1.187 |
|---|---|---|
| Filler | mm | 1.856 |
| Area of interstices | sq. mm | 2.203 |

Size of threads (diameter):
| Warp | mm | 1.116 |
|---|---|---|
| Filler | mm | 1.539 |

Number of threads per foot:
| Warp | 106 |
|---|---|
| Filler | 111 | was treated in the manner described in Example I except that the bridging composition was as follows:

|  | Percent by weight |
|---|---|
| Cellulose nitrate | 10.9 |
| Polyvinyl acetate | 1.1 |
| Ethyl acetate | 44.0 |
| Ethyl alcohol | 44.0 |

The above composition was prepared by first dissolving 24 ounces of cellulose nitrate in a gallon of solvent mixture containing equal parts of ethyl acetate and ethyl alcohol. One part of polyvinyl acetate was dissolved in 9 parts of a mixture containing equal parts of ethyl acetate and ethyl alcohol. The two separate solutions were blended with additional solvents to produce the above formula.

The cellulose nitrate in the above formula had a nitrogen content of 11.85% to 12.00% and a viscosity characteristic of 80 to 300 seconds as determined by the viscosity of a 16 ounce concentration by the falling ball method such as described in A. S. T. M. method 301-33 using formula A.

The polyvinyl acetate in the above formula was the same as that described in Example I.

The bridged leno cloth described in Example III is not adapted to the use of a thermoplastic cement which requires a temperature of 400° F. for a period of two or three minutes, to activate the adhesiveness, since the cellulose nitrate will decompose at this temperature. The cellulose nitrate-polyvinyl acetate bridged leno cloth is adapted for use with cements which will be activated at temperatures below 300° F. or by means of a solvent.

While the bridging compositions herein disclosed are designed primarily for bridging the interstices of leno woven fabrics, they may also be used to bridge the interstices of somewhat differently woven fabrics to prevent the coating which is subsequently applied from striking through the fabric.

Solutions of certain polymers of vinyl acetate have the unique property of bridging interstices of open weave fabrics and forming an individual film in the interstices upon removal of the volatile solvent. It has been discovered that not all solutions of vinyl acetate polymers have the unique property of solution stringiness which permits the bridging of large interstices. The viscosity characteristic together with the stringiness characteristic of the solution appears to be the determining factor of a suitable polymer for bridging large interstices. For those polymers of vinyl acetate which have the unique property of solution stringiness, the viscosity of a 10% solution in equal parts of ethyl acetate and ethyl alcohol may vary within the range of 3 seconds to 15 seconds as determined by the falling ball method described in A. S. T. M. 301-33.

If the viscosity of the polyvinyl acetate solution having the stringing characteristic is greater than 15 seconds there is a tendency for the solution to coat over the fabric and cover the entire fabric with a continuous film which is objectionable in the manufacture of carpet seam tape. The minimum concentration of solutions suitable for bridging large interstices is controlled by the viscosity characteristic. The concentration is adjusted so that the solution will not flow through the interstices or be spread on the surface of the fabric, and this can be readily determined by those skilled in the art.

It is to be noted that the viscosity characteristics discussed above refer to the polyvinyl acetate solutions, and not the solution viscosity of the material with which it is blended or the blends. The solutions of the blends may have viscosities different from the polyvinyl acetate solutions alone. The viscosity of the polyvinyl acetate solution is the controlling factor for a suitable bridging composition and not the viscosity of a solution of a blend of polyvinyl acetate and another film-forming composition.

As little as 5% of polyvinyl acetate blended with 95% (on a dry basis) of a cellulose derivative or a resinous material with which it is compatible will impart sufficient bridging characteristics to the cellulose derivative or resinous material to allow the bridging of interstices of open weave fabrics which cannot be bridged with the cellulose derivative or resinous material alone. On a dry basis the amount of the polyvinyl acetate in the bridging composition varies between 5% and 100% of the film.

Cellulose derivatives other than cellulose nitrate and cellulose acetate mentioned in the examples may be blended with the polyvinyl acetate, such as, e. g., ethyl cellulose, benzyl cellulose, cellulose acetopropionate, and cellulose aceto butyrate. In the claims the term "cellulose derivatives" is used to refer to cellulose esters, cellulose ethers, and mixed cellulose esters.

The polyvinyl acetate may be blended with resinous film-forming materials which do not have the property when used alone of bridging interstices in open weave fabrics and which are compatible with the polyvinyl acetate, such as for example, methyl methacrylate, vinyl chloride, and co-polymers of vinyl chloride and vinyl acetate.

In the preferred embodiment described in the examples the size of the interstices in the leno cloth varies between 3.456 sq. mm. and 1.63 sq. mm. The greatest horizontal distance between the peripheries of two threads forming the boundary of an interstice of the fabrics described in Examples I, II, and III is 2.068 millimeters and the shortest distance is 1.13 millimeters. Interstices having an area of approximately 2.25 sq. mm. can be bridged with a single application of any one of the bridging compositions disclosed. Interstices having an area greater than 2.25 sq.

mm. require two or more applications of the bridging composition. The amount of bridging composition applied is in proportion to the size of the interstices. The larger the interstice the greater the quantity and number of applications of bridging composition applied. In the claims the term "open weave" is intended to refer to strong fabrics having interstices at least 1 mm. in their shortest dimension and up to any size which may be bridged such as 3 or 4 mm. in the widest dimension.

In Example I the thermoadhesive composition is applied on the side opposite from which the bridging composition was applied such as shown by Figure 2. It is also to be understood that the thermoadhesive composition may be applied on the same side as the bridging composition as shown by Figure 1.

The invention herein described, while particularly adapted for bridging the large interstices in leno fabric, will find great utility in the manufacture of coated fabrics in general employing drying oils, cellulose derivatives, rubber, and resin compositions where there is a tendency for the surface coating to strike through the fabric, particularly in the case of square woven fabrics. A single application of the bridging compositions of this invention will close the interstices and prevent the surface coating from striking through the fabric.

The treated leno fabric of the present invention has the advantage of rapid heat transfer from a hot flatiron to the thermoplastic cement through polyvinyl acetate films, without the latter becoming sticky and adhering to the hot flatiron.

A further advantage is that the interstices of the fabric are closed with a non-thermoadhesive substance and the thermoadhesive substance is applied on the surface of the fabric where it has the maximum contact with the carpet backing and results in a firm bond between the treated leno cloth and the carpet backing with a minimum amount of the thermoadhesive substance.

It is apparent that many widely different embodiments of this invention may be made without departing from the spirit and scope thereof, and therefore, it is not intended to be limited except as indicated in the appended claims.

I claim:

1. An open weave fabric having the interstices bridged with individual films of a non-thermoadhesive composition containing polyvinyl acetate, a 10% solution of which in equal parts of ethyl alcohol and ethyl acetate has a viscosity of 3 to 15 seconds as determined by the falling ball method.

2. The product of claim 1 in which the fabric has a leno weave.

3. A leno woven fabric having the interstices bridged with individual films of a non-thermoadhesive composition consisting of 5% to 95% polyvinyl acetate and 95% to 5% of a cellulose ester, a 10% solution of said polyvinyl acetate in equal parts of ethyl alcohol and ethyl acetate having a viscosity characteristic of 3 to 15 seconds as determined by the falling ball method.

4. The product of claim 3 in which the cellulose ester is cellulose acetate.

5. The process of bridging the interstices of an open weave which comprises applying a film forming composition to a leno woven fabric by means of a doctor knife, at least 5% of the non-volatile ingredients of the said composition comprising polyvinyl acetate, a 10% solution of said polyvinyl acetate dispersed in equal parts of ethyl alcohol and ethyl acetate having a viscosity characteristic of 3–15 seconds as determined by the falling ball method, depositing said composition in the interstices of said fabric between the top of the threads and the middle horizontal plane of said interstices and thereafter drying which composition does not become sticky when subjected to a temperature of about 400° F. for a period of two or three minutes.

6. The process of bridging the interstices of a leno woven fabric which comprises applying thereto a composition containing cellulose acetate and polyvinyl acetate, a 10% solution of the latter having a viscosity of about 7 seconds, passing the coated fabric between two smooth pressure rollers, which composition does not become sticky when subjected to a temperature of about 400° F. for a period of two or three minutes, and thereafter applying thereto a thermoadhesive composition.

7. An open weave woven fabric having the interstices bridged with a composition consisting of 5% to 95% polyvinyl acetate and 95% to 5% of a material selected from the class consisting of methyl methacrylate, vinyl chloride, and copolymer of vinyl chloride and vinyl acetate, a 10% solution of said polyvinyl acetate in equal parts of ethyl acetate and ethyl alcohol having a viscosity characteristic of 3 to 15 seconds as determined by the falling ball method.

8. An open weave fabric having the interstices closed with a composition which does not become sticky when subjected to a temperature of about 400° F. for a period of two or three minutes comprising, as an essential ingredient, at least 5% of polyvinyl acetate, a 10% solution of said polyvinyl acetate dispersed in equal part of ethyl acetate and ethyl alcohol having a viscosity characteristic of 3–15 seconds as determined by the falling ball method.

9. An open weave fabric having the interstices closed with individual films which do not become sticky when subjected to a temperature of about 400° F. for a period of two or three minutes comprising, as an essential ingredient, at least 5% of polyvinyl acetate, a 10% solution of said polyvinyl acetate dispersed in equal part of ethyl acetate and ethyl alcohol having a viscosity characteristic of 3–15 seconds as determined by the falling ball method, and a surface coating of a thermoadhesive composition over said individual films.

10. The product of claim 8 in which the fabric has a leno weave.

11. The product of claim 8 in the form of a tape for joining the abutted edges of a carpet seam.

ALVA W. BATEMAN.